(12) United States Patent
Corbett et al.

(10) Patent No.: US 7,023,342 B2
(45) Date of Patent: Apr. 4, 2006

(54) CONTINUOUS WAVE (CW)—FIXED MULTIPLE FREQUENCY TRIGGERED, RADIO FREQUENCY IDENTIFICATION (RFID) TAG AND SYSTEM AND METHOD EMPLOYING SAME

(75) Inventors: Blaise L. Corbett, King George, VA (US); Michael L. Workman, Ruther Glen, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 60 days.

(21) Appl. No.: 10/666,823

(22) Filed: Sep. 17, 2003

(65) Prior Publication Data

US 2005/0057368 A1    Mar. 17, 2005

(51) Int. Cl.
*G08B 13/14* (2006.01)
(52) U.S. Cl. ............................ 340/572.1; 340/572.4; 340/10.41; 340/10.2; 340/541; 342/42; 342/44; 342/51
(58) Field of Classification Search ............ 340/572.1, 340/572.4, 10.1, 10.3, 5.8, 825.49, 10.41, 340/10.2, 541, 42, 44, 51
See application file for complete search history.

(56) References Cited

U.S. PATENT DOCUMENTS

| | | | |
|---|---|---|---|
| 5,381,137 A | 1/1995 | Ghaem et al. ............... 340/572 |
| 5,446,447 A | 8/1995 | Carney et al. ............... 340/572 |
| 5,473,330 A | 12/1995 | Lauro et al. .................. 342/42 |
| 5,604,486 A | 2/1997 | Lauro et al. ................. 340/572 |
| 5,621,412 A * | 4/1997 | Sharpe et al. ............ 340/10.33 |
| 5,710,556 A * | 1/1998 | Nishimura et al. ......... 340/928 |
| 5,856,788 A | 1/1999 | Walter et al. ........... 340/825.54 |
| 6,265,962 B1 | 7/2001 | Black et al. ................ 340/10.2 |
| 6,452,504 B1 | 9/2002 | Seal ....................... 340/825.49 |
| 6,483,426 B1 | 11/2002 | Pagnol et al. ............... 340/10.1 |
| 6,483,427 B1 | 11/2002 | Werb .......................... 340/10.1 |
| 6,675,476 B1 * | 1/2004 | Hostetler .................... 29/890.1 |
| 2001/0040507 A1 | 11/2001 | Eckstein et al. .......... 340/572.4 |
| 2002/0149484 A1 * | 10/2002 | Carrender ................. 340/572.4 |
| 2004/0132406 A1 * | 7/2004 | Scott et al. ................. 455/41.1 |

OTHER PUBLICATIONS

Texas Instruments Incorporated, "Three Channel LF Transceiver (3D AFE) TMS37122", Copyright Dec. 2001.

* cited by examiner

*Primary Examiner*—Tai T. Nguyen
(74) *Attorney, Agent, or Firm*—Gerhard W. Thielman, Esq.; Scott R. Boalick, Esq.; Matthew J. Bussan, Esq.

(57) ABSTRACT

A far field radio frequency identification (RFID) tagging and tracking system employing a plurality of continuous wave (CW), unmodulated signals selected from frequencies including a predetermined frequency band, includes a RFID interrogator generating a group of CW unmodulated signals corresponding to a RFID tag and receiving a tag identification (ID) signal sequence uniquely identifying the RFID tag, while the RFID tag includes a power source supplying power to the RFID tag but not including a microprocessor. A corresponding RFID tag and method for operating both the tag and the system are also described.

32 Claims, 5 Drawing Sheets

CONTINUOUS WAVE (CW)—FIXED MULTIPLE FREQUENCY TRIGGERED, RADIO FREQUENCY IDENTIFICATION (RFID) TAG AND SYSTEM AND METHOD EMPLOYING SAME

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

The present invention relates generally to a Radio Frequency Identification (RFID) tags and systems employing same. More specifically, the invention relates to a RFID tag and corresponding system employing same triggered by a fixed multiple frequency signal. A method for operating the RFID tag is also disclosed.

Radio Frequency Identification (RFID) is becoming an important identification technology in applications such as inventory management, security access, personnel identification, factory automation, automotive toll debiting, and vehicle identification, to name just a few. RFID systems utilize an RFID transmitter-receiver unit (usually referred to as a base station or interrogator) to query an RFID transponder or tag which maybe located within a maximum distance from the interrogator unit. The RFID tag detects the interrogating signal and transmits a response signal containing encoded data back to the receiver.

RFID systems provide identification functions not found in identification technologies such as optical indicia, e.g., bar code, recognition systems. For example, RFID systems may employ RFID tags containing read/write memory of several kilobytes or more. The RFID tags may be readable at a distance and do not require direct line-of-sight view by the reading apparatus, e.g., the base station or interrogator. Furthermore, several such RFID tags may be read by the RFID system at one time, if techniques and/or methods for data collision avoidance, as discussed more fully below, are implemented in the RFID system.

Current developments in the area of RFID tagging and tracking systems have generally evolved into two distinct technology fields, i.e., Near Field Devices and Far Field Devices. Both types of devices employ some common architecture. For example, both types of system employ the interrogator and at least one transponder tag. The interrogator transmits a query signal to the tag and receives data transmitted from the tag. The architecture of each tag generally employs an antenna, a rectifier circuit, and a state machine for modulating-transmitted data. One example of a state machine is a logic circuit that transitions, i.e., steps, through a series of predetermined output states as a series of pulses is applied to the tag circuitry. A clocking circuit of some description usually applies these pulses.

Near Field RFID tags generally employ the simplest circuits. Typical RFID tags have a patch antenna, diode detection for triggering a response, and transmission circuitry for sending data back to the interrogator. Transmission circuitry for this RFID tag usually includes the state machine and a transistor device, the latter being used to change the impedance of the tag's antenna. Most of these RFID systems use a technique called back scattering. The operation of a system based on this technique uses an un-modulated, single frequency continuous wave (CW) signal sent by the interrogator. This CW signal triggers or "wakes-up" the transmitter on the tag. The tag then modulates the reflection of this signal by changing the impedance of the antenna in the RFID tag in accordance with a code supplied by a state machine. It will be appreciated that these systems generally have very limited range. It will also be appreciated that this is done to prevent "collision" of data between two or more tags in close proximity.

It should be mentioned that the RFID tags in a near field RFID system may or may not have a battery. Those without a battery are known as "passive" tags. Simpler systems employ passive tags.

In contrast, the tags employed in a Far Field RFID system have developed around the use of microprocessors and software algorithms. In operation, the interrogator sends a modulated RF signal to the RFID tag. The microprocessor embedded in the RFID tag interprets the received signal and determines the need for a response signal, i.e., determines whether or not a response signal is warranted. It should be mentioned that data collision is avoided in this system because the RFID tag will respond only when the modulated signal received matches a code stored in the tag and accessed by the microprocessor. If the received signal matches a predetermined code, the tag "wakes-up" and transmits the requested data via a radio circuit. The encoding and the transmission by the tag is handled by either the microprocessor or a state machine that performs the carrier modulation. These circuits are fairly complex and expensive due to the use of microprocessors. These tags generally have some power source in the tag device.

What is needed is a low cost, far field radio frequency identification (RFID) tagging and tracking system. It would be desirable if the RFID tagging and tracking system could utilize lost cost and/or passive RFID tags without encountering data collision. It would also be advantageous if the RFID tagging and tracking system can be utilized in the tracking of inventory and assets for a wide range of applications including, but not limited, to inventory data collection in a warehouse system, tracking of mobile assets, and security monitoring.

SUMMARY OF THE INVENTION

Based on the above and foregoing, it can be appreciated that there presently exists a need in the art for a far field radio frequency identification (RFID) tagging and tracking system that overcomes the above-described deficiencies. The present invention was motivated by a desire to overcome the drawbacks and shortcomings of the presently available technology, and thereby fulfill this need in the art.

According to one aspect, the present invention provides a far field radio frequency identification (RFID) tag responsive to a plurality of continuous wave (CW), unmodulated signals selected from frequencies including a predetermined frequency band, the RFID tag including a power source supplying power to the RFID tag but not including a microprocessor. If desired, the RFID tag includes an antenna generating received CW signals responsive to the CW unmodulated signals, a filter bank generating noise-reduced CW signals responsive to the received CW signals, a rectifier bank generating a binary word responsive to the noise-reduced CW signals, a logic circuit generating a command signal when the received binary word corresponds to a tag identifier code programmed into the logic circuit, and a state machine coupled to the antenna and responsive to the command signal generating information identifying the RFID tag for transmission via the antenna. In an exemplary case, the RFID tag includes a timer generating a clock signal applied to the state machine. Alternatively, the RFID tag can include a counter generating a count signal applied to the state machine in response to a supplied one of the CW unmodulated frequency signals. In any case, the logic circuit can be formed from a field programmable gate array (FPGA), which may additionally include the state machine.

According to another aspect, the present invention provides a method of operating a far field radio frequency identification (RFID) tag responsive to a plurality of continuous wave (CW), unmodulated signals selected from frequencies including a predetermined frequency band, wherein the RFID tag includes an antenna, a filter bank, a rectifier bank, a logic circuit, and a state machine, electrically coupled to one another in the recited order, the state machine being coupled to the antenna, and a power source supplying power to the RFID tag, but not including a microprocessor. The method includes step for identifying a binary word included in the CW unmodulated signals, comparing the binary word to a tag identifier for the RFID tag programmed into the logic circuit, and when the binary word matches the tag identifier, controlling the state machine to output information distinguishing the RFID tag from similar RFID tags. In an exemplary case, the binary word corresponds to M of N possible frequencies in the predetermined frequency band, M and N are positive integers, there are at least $2^M-1$ possible combinations of frequency selection representative of the binary code, and $N \geq M$.

According to a further aspect, the present invention provides a far field radio frequency identification (RFID) tagging and tracking system employing a plurality of continuous wave (CW), unmodulated signals selected from frequencies including a predetermined frequency band, the system including a RFID interrogator generating a group of CW unmodulated signals corresponding to a RFID tag and receiving a tag identification (ID) signal sequence uniquely identifying the RFID tag, and the RFID tag including a power source supplying power to the RFID tag but not including a microprocessor. If desired, the RFID tagging and tracking system includes a RFID interrogator and at least one RFID tag. The RFID interrogator includes first and second antennas, a front end coupled to the first antenna that extracts the tag ID signal sequence from a received signal, a controller receiving the tag ID signal sequence and generating control signals, a multiple frequency generator generating a plurality of CW unmodulated frequency signals, a switch array responsive to the control signals that route selected ones of the CW unmodulated frequency signals to a frequency summer, and the frequency summer, which applies the selected ones of the CW unmodulated frequency signals to the second antenna. Moreover, the RFID tag includes a third antenna generating received CW signals responsive to the selected ones of the CW unmodulated frequency signals output by the second antenna, a filter bank generating noise-free CW signals responsive to the received CW signals, a rectifier bank generating a binary word responsive to the noise-reduced CW signals, a logic circuit generating a command signal when the received binary word corresponds to a tag identifier code programmed into the logic circuit, and a state machine coupled to the third antenna and responsive to the command signal generating the tag ID signal sequence for transmission via the third antenna to the RFID interrogator. It should be noted that the first antenna could include a directional antenna, which permits the controller to determine a bearing line to the RFID tag. In any event, the controller provides a data storage function and a display function.

According to a still further aspect, the present invention provides a method for operating a far field radio frequency identification (RFID) tagging and tracking system responsive to a plurality of continuous wave (CW), unmodulated frequency signals selected from frequencies including a predetermined frequency band, wherein a RFID interrogator includes a multiple frequency generator producing the frequencies included in the predetermined frequency band, a controller, a switch array operated by the controller, and a frequency summer for combining the CW unmodulated frequency signals output by the switch array, while a RFID tag includes an antenna, a filter bank, a rectifier bank, a logic circuit, and a state machine, electrically coupled to one another in the recited order, the state machine being coupled to a RFID tag antenna, a power source supplying power to the RFID tag, but not including a microprocessor, including transmitting CW unmodulated frequency signals corresponding to a binary word, extracting the binary word from the CW unmodulated frequency signals, comparing the binary word to a tag identifier for the RFID tag programmed into the logic circuit, and when the binary word matches the tag identifier, controlling the state machine to output a tag identification (ID) signal sequence distinguishing the RFID tag from similar RFID tags. In an exemplary case, the binary word corresponds to M of N possible frequencies in the predetermined frequency band, M and N are positive integers, there are at least $2^M-1$ possible combinations of frequency representative of the binary code, and $N \geq M$.

BRIEF DESCRIPTION OF THE DRAWINGS

These and various other features and aspects of the present invention will be readily understood with reference to the following detailed description taken in conjunction with the accompanying drawings, in which like or similar numbers are used throughout, and in which.

DETAILED DESCRIPTION OF THE PREFERRED EMBODIMENTS

As mentioned above, the far field radio frequency identification (RFID) tagging and tracking system according to the present invention includes low cost RFID tags that can respond to queries from a RFID interrotator without producing undesirable data collision. It will be appreciated that this operational characteristic of the RFID tags stems from the fact that only one of the RFID tags will "wake-up" and respond to a particular fixed frequency trigger signal generated by the RFID interrogator. It will also be appreciated that the RFID tagging and tracking system advantageously can be utilized in the tracking of inventory and assets for a wide range of applications including but not limited to inventory data collection in a warehouse system, tracking of mobile assets, e.g., tanks, trucks, etc., and security monitoring of personnel.

In the far field RFID tagging and tracking system according to the present invention, the interrogator alone contains all complex components, i.e., microprocessors or control units, for the system while each RFID tag contains relatively simple logic circuits. Advantageously, a small power source can also reside in the RFID tag. The RFID tagging and tracking system relies on a novel binary system to prevent data collision between tags in close proximity, More specifically, the RFID interrogator unit transmits multiple, fixed, unmodulated continuous wave (CW) signals over the coverage area. The specific frequencies transmitted by the RFID interrogator are selected from frequencies obtained by dividing the frequency band of, for example, 2350 to 2450 MHz into a number of discreet frequency sub-bands. It will be appreciated that other frequency bands can also be employed. Each of the selected frequencies represents a single bit in a multiple bit binary code.

Before discussing the operation of the far field RFID tagging and tracking system according to the present invention in greater detail, various preferred embodiments of the tag and the interrogator units will first be presented.

Figure 1:
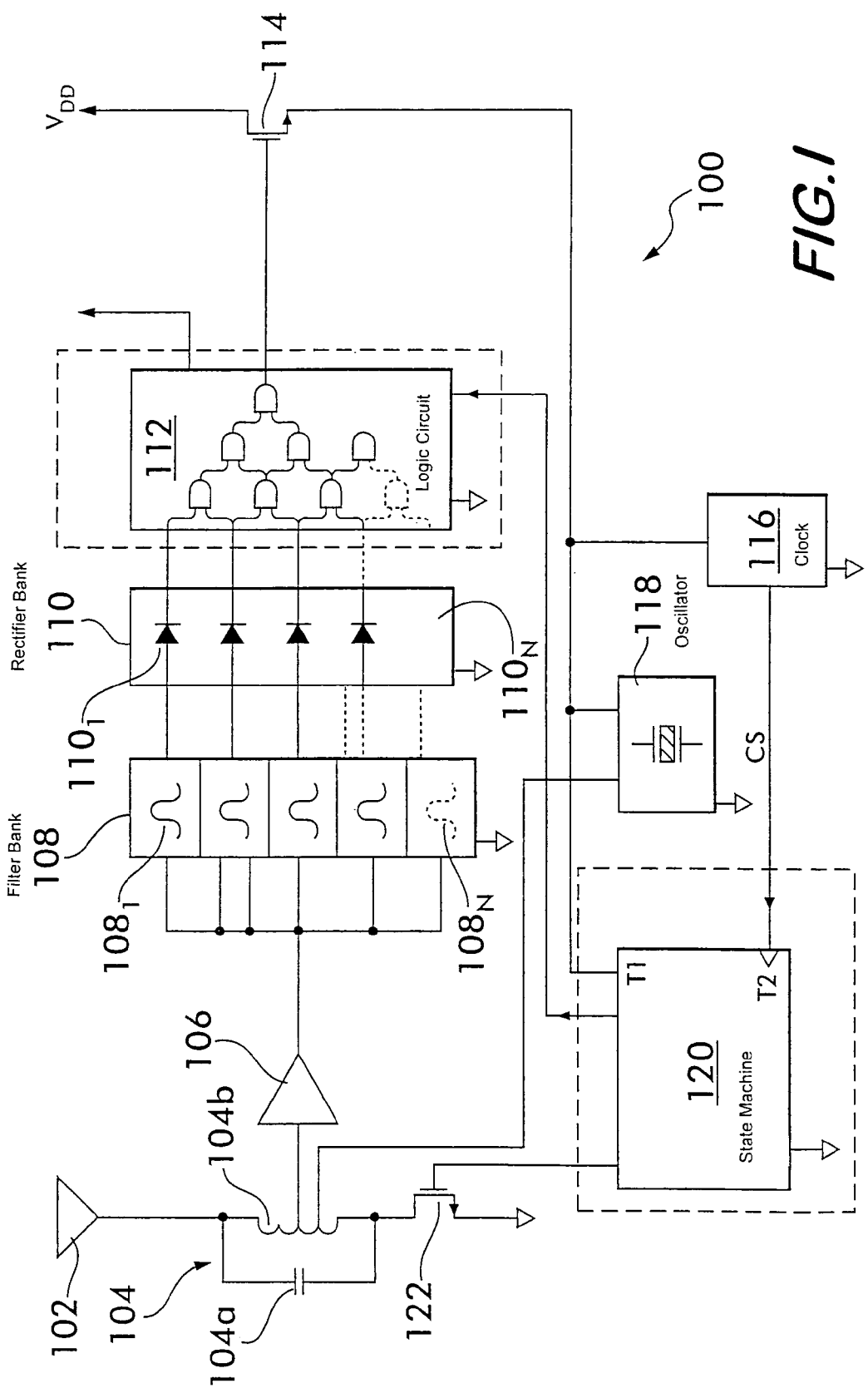
FIG. 1 is partially schematic, partially block diagram of a first preferred embodiment of a frequency identification (RFID) tag employed in a far field RFID tagging and tracking system according to the present invention.

FIG. 1 is partially schematic, partially block diagram of a frequency identification (RFID) tag 100 employed in a far field RFID tagging and tracking system according to the present invention, which tag includes an antenna 102 coupled to an amplifier 106 via an inductor—capacitor (LC) network 104. In an exemplary case, the network 104 includes a capacitor 104a and an inductor 104b. The amplified signal produced by the amplifier 104 is routed, via parallel paths, to a logic circuit 112, through a filter bank 108, which includes bandpass (notch) filters $108_1$–$108_N$, and a rectifier bank 110, which includes rectifiers $110_1$–$110_N$. It will be noted that each of the rectifiers $110_1$–$110_N$ convert a sinusoidal signal received via one of the bandpass (notch) filters $108_1$–$108_N$, respectively, to a dc level energy signal. The digital signal output by the logic circuit 112 is provided to the control terminal of a switch 114, with controls the voltage $V_{DD}$ applied to the power input terminal of a clock 116, the power input terminal of an oscillator 118, and the power input terminal T1 of a state machine 120. It will be appreciated that the state machine 120 receives a clock signal CLK output by the clock 116 at input terminal T2 and provides a control signal CS to a second switch 122. A reset signal RS generated by the state machine 120 can be applied to the logic circuit 112, as discussed below. It will also be appreciated that $V_{DD}$ can be generated by any known voltage source suitable for this application.

It should be mentioned that the switches 114 and 122 advantageously could be semiconductor switches. Preferably, switches 114 and 122 are transistor switches and, most preferably, switches 114 and 122 are field effect transistors (FETs). It should also be mentioned that each of the bandpass (notch) filters $108_1$–$108_N$ advantageously can be surface acoustic wave (SAW) filters, although any filter that minimizes occupied real estate on tag 100 can also be employed in constructing the filter bank 108. Finally, it should be mentioned that N is any positive integer, although N is generally $\geq 6$.

Figure 2:
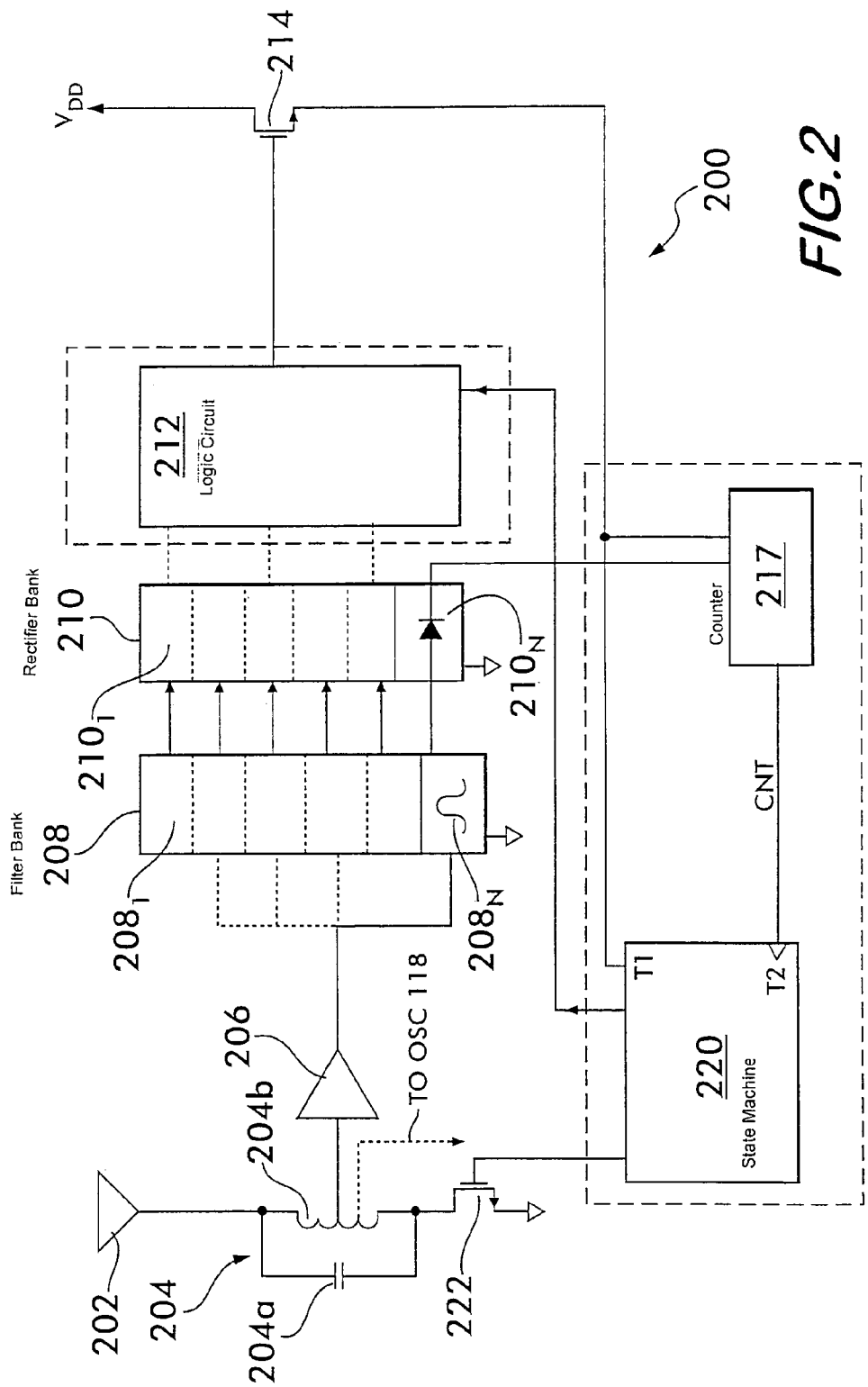
FIG. 2 is partially schematic, partially block diagram of a second preferred embodiment of a RFID tag employed in a far field RFID tagging and tracking system according to the present invention.

FIG. 2 is partially schematic, partially block diagram of a RFID tag 200, which may also be employed in a far field RFID tagging and tracking system according to the present invention. As shown in FIG. 2, the tag 200 includes an antenna 202 coupled to an amplifier 206 via a LC network 204. In an exemplary case, the network 204 includes a capacitor 204a and an inductor 204b. The amplified signal produced by the amplifier 206 is routed, via parallel paths, to a logic circuit 212, through a filter bank 208, which includes band-pass (notch) filters $208_1$–$208_N$, and a rectifier bank 210, which includes rectifiers $210_1$–$210_N$. It will be noted that each of the rectifiers $210_1$–$210_N$ convert a sinusoidal signal received via one of the bandpass (notch) filters $208_1$–$208_N$, respectively, to a dc level energy signal. The digital signal output by the logic circuit 212 is provided to the control terminal of a switch 214, with controls the voltage $V_{DD}$ applied to the power input terminal of a counter 217, and the power input terminal T1 of a state machine 220. It will be appreciated that the state machine 220 receives a count signal CNT output by the counter 217 at input terminal T2 and provides a control signal CS to a second switch 222. A reset signal RS generated by the state machine 220 can be applied to the logic circuit 212, as discussed below.

It should be mentioned that the switches 214 and 222 advantageously could be semiconductor switches. Preferably, switches 214 and 222 are transistor switches and, most preferably, switches 214 and 222 are FETs. It mentioned above, each of the notch filters $208_1$–$208_N$ advantageously can be surface acoustic wave (SAW) filters, although any filter that optimizes real estate utilization on tag 200 can also be employed in constructing the filter bank 208. Finally, it should be mentioned that although N is any positive integer, e.g., any integer $\geq 6$, N is constrained to be one greater than the total number of input terminals of the logic circuit 212; the output of rectifier $210_N$, in an exemplary case, is applied to the counter 217. The clocking pulse for counter 217 corresponds to the signal received from the interrogator circuit FIG. 300 (300') via the signal line including switch $338_N$. In other words, the clocking rate for the RFID tag 200 advantageously can by controlled by the RFID interrogator 300 (300').

Figure 3:
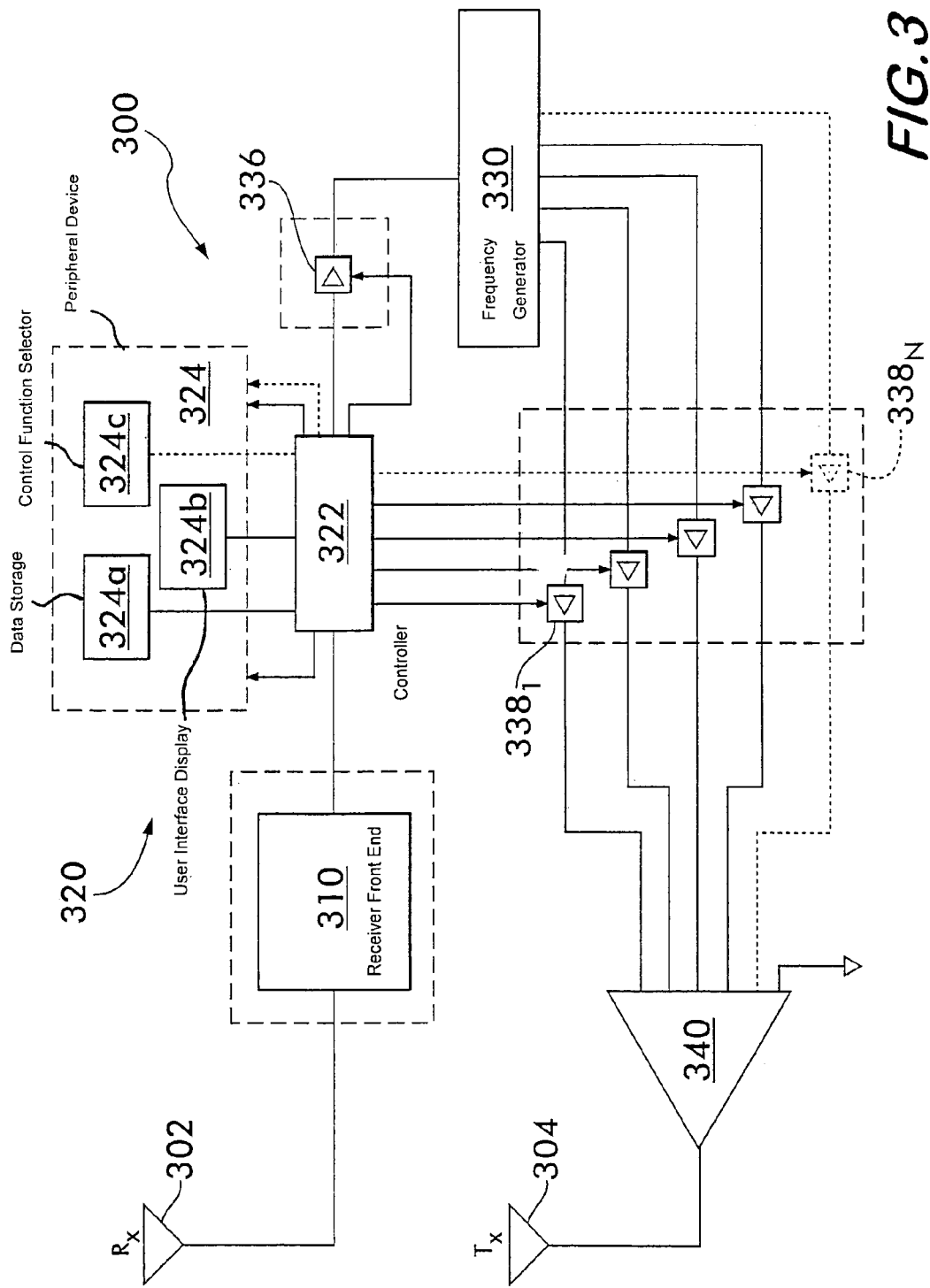
FIG. 3 is partially schematic, partially block diagram of a preferred embodiment of a RFID interrogator employed in a far field RFID tagging and tracking system according to the present invention.

FIG. 3 is partially schematic, partially block diagram of a RFID interrogator 300 employed in a far field RFID tagging and tracking system according to the present invention, which includes a pair of antennas 302,304 that are employed in communicating with the tags 100, 200, as described above. The receive antenna 302 provides signals received from the tags 100, 200 to a receiver front end 310, which advantageously includes demodulators, peak detection filters, etc. The construction of the receiver front end 310 is well known to one of ordinary skill in the art and will not be described further. The signals recovered by the front end 310 are provided to a control section 320, which advantageously includes a controller 322 coupled a peripheral device 324. It will be noted that the device 324 can include, in an exemplary case, a data storage device 324a, a user interface display 324b, a master/slave and other control function selector 324c.

It will be appreciated that the functions available from the control section 320 are not limited to the enumerated functions. It will also be appreciated that the control section 320 provides control signals to switch 336 and switches $338_1$–$338_N$. The switch 336 controls the operation of a multiple frequency generator 330, which generates multiple discrete frequencies within a predetermined frequency band, e.g., the 2350 to 2450 MHz frequency band, which advantageously can be selectively applied to the antenna 304 via the switches $338_1$-$338_N$ and a frequency summer 340. Switch $338_N$ facilitates the delivery of the optional clocking signal for the RFID tag 200.

It should be noted that while the front end 310 was described above as including demodulator and peak detector filters, the front end is not limited to these components. The front end 310 contains components sufficient to permit the front end to detect the modulated signal(s) produced from any one of the activated RFID tags 100, 200 with a minimal amount of noise interference and provide the extracted information to the control section 320 in an interpretable language, i.e. binary code. It should also be noted that the control section 320 may provide any number of functions, e.g., a data storage function, a user display function, a master/slave control function, and other such functions desired by the user. In other words, the functions provided by the control section may vary depending upon the needs of the user. Moreover, it should be mentioned that the control section 320 advantageously can be a stand-alone or and integrated computer, e.g., a commercial off the shelf (COTS) computer.

It will be appreciated that the switch 336 and its associated control line are optional. This switch was included in the RFID interrogator 300 to indicate that some type of scheme could be accommodated to isolate the multiple frequency generator 330 from the control section 320. The control section 320 and switches $338_1$-$338_N$ cooperate to select the transmitted frequencies corresponding to the cycled binary code (word) of one of the tags 100, 200 while the multiple frequency generator 330 provides all the discrete frequencies needed to accomplish the task.

FIG. 3 illustrates one configuration of the RFID interrogator 300 that includes two antennas 302 and 304. It will be appreciated that a single antenna interrogator advantageously could be employed with appropriate antenna modifications, i.e. impedance balancing. In another configuration, antenna 302 could be a directional antenna while antenna 304 is an omnidirectional antenna. Moreover, it will also be appreciated that this is only one possible configuration for the interrogator 300. Any configuration of component that provides at least two functions, i.e., receiving the modulated signal from the RFID tags and processing that signal and transmitting the requisite frequencies corresponding to a binary coded tag identification, is considered to fall within the scope of the RFID tagging and tracking system according to the present invention. It will be noted that additional functions, e.g., generating a clocking pulse that can also be output to the tag 200, can also be included. See switch $338_N$ in FIG. 3 and FIG. 4.

Figure 4:
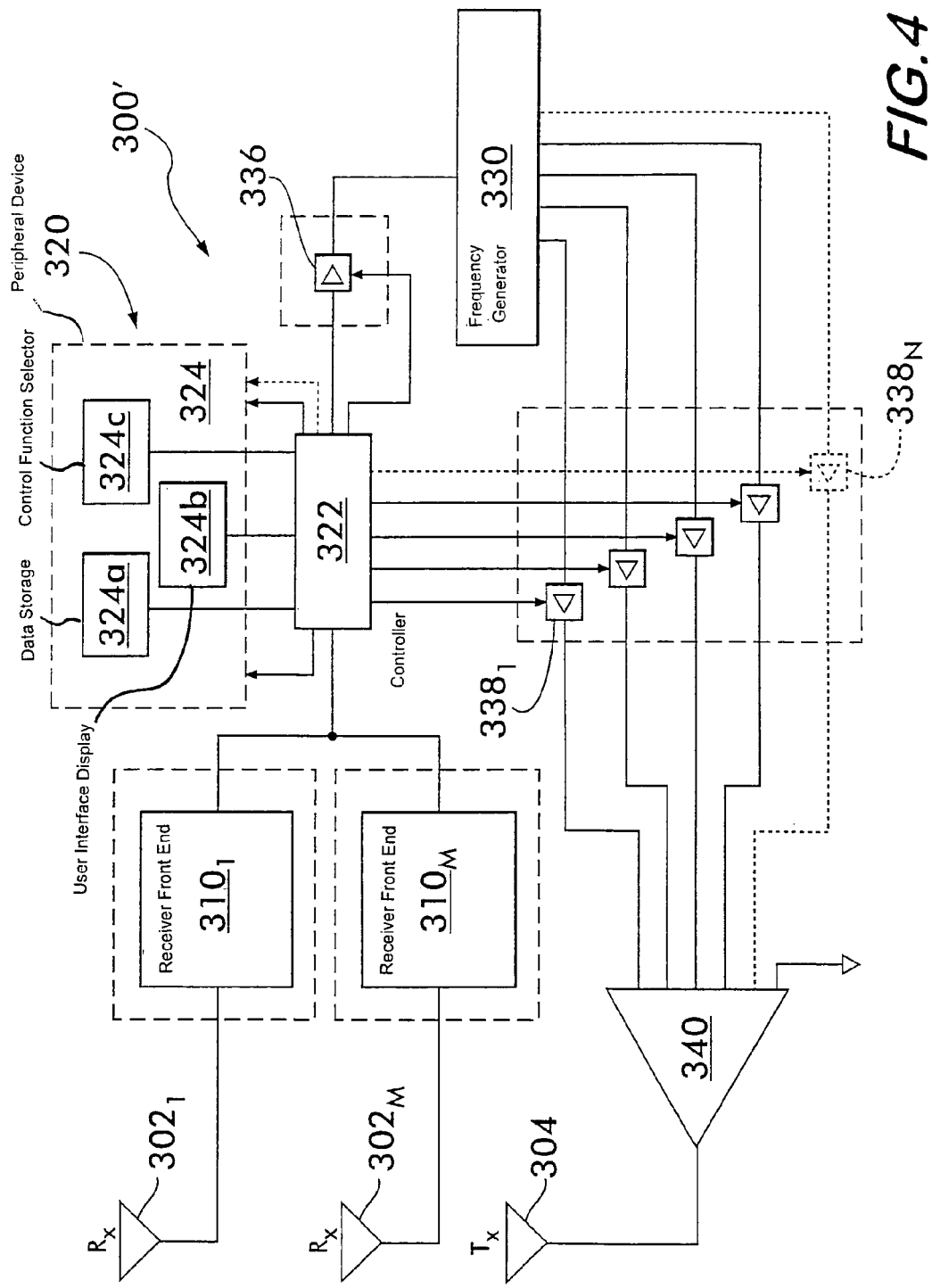
FIG. 4 is partially schematic, partially block diagram of an alternative preferred embodiment of a RFID interrogator employed in a far field RFID tagging and tracking system according to the present invention.

FIG. 4 is partially schematic, partially block diagram of an alternative embodiment of the interrogator 300, i.e., an RFID interrogator 300' employed in a far field RFID tagging and tracking system according to the present invention. From FIG. 4 it will be appreciated that the RFID interrogator 300' is substantially similar to the RFID interrogator 300 except for the inclusion of multiple receiver antennas $302_1$, $302_M$ and front ends $310_1$, $310_M$. If desired, a multiplexer (not shown) advantageously can be employed to couple the front ends $310_1$, $310_M$ to the control section 320. Here, M advantageously can be any positive integer greater than 1.

Figure 5A:
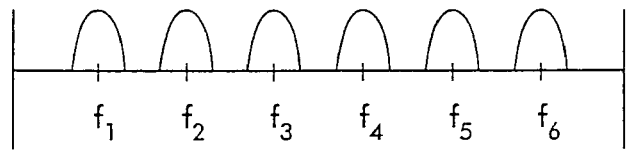
FIGS. 5A, 5B, 5C, and 5D are diagrams that are useful in explaining the operation of the far field RFID tagging and tracking system according to the present invention.
Figure 5B:
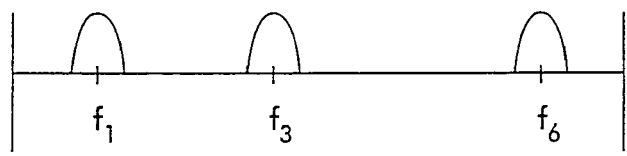
Figure 5C:
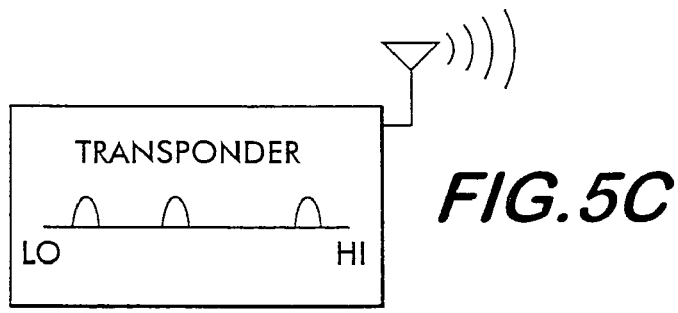

The control section 320 within the RFID interrogator 300 cycles a binary code that represents a unique identifier for a tag 100,200. This code is then transmitted by the RFID interrogator 300 in the form of selected CW, unmodulated frequency signals during a tag interrogation stage. Thus, the multiple frequency generator 330 produces N discrete frequencies, as shown in FIG. 5A while selected ones of these discrete frequencies (frequencies f1, f3, and f6 in FIG. 5B) are selected by switches $338_1$-$338_N$, combined by summer 340, and transmitted by antenna 304. See FIG. 5C.

In the tags 100, 200 illustrated in FIGS. 1 and 2, respectively, each tag utilizes a series of narrow band-pass (notch) filters $108_1$-$108_N$ or $208_1$-$208_N$ tuned between the frequencies of, for example, 2350 MHz and 2450 MHz. It will be appreciated that these filters can be designed using widely available commercial off the shelf (COTS) components. Preferably, each of these filters $108_1$-$108_N$ or $208_1$-$208_N$ feed a corresponding rectifier $110_1$-$110_N$ or $210_1$-$210_N$ in rectifier bank 110 or 210, respectively. The resulting DC signals from one of these rectifier banks represent a unique binary code. This signal will then be applied to a simple logic circuit 112 or 212, which advantageously is composed of simple logic gates, e.g., AND, OR, NAND, and NOR gates.

Figure 5D:
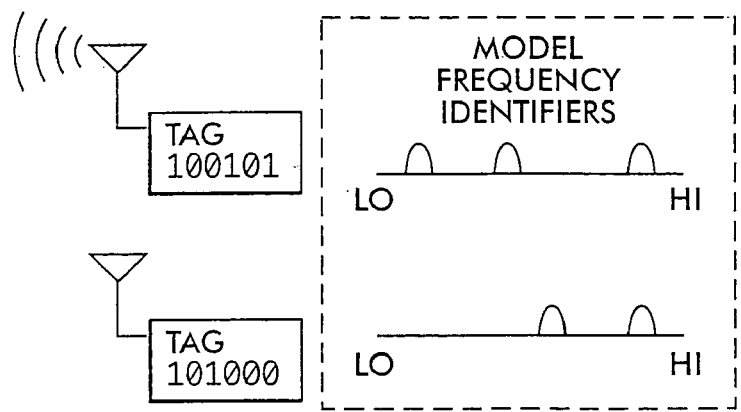

The correct logic sequence will "wake-up" the tag 100, 200 and the tag information will be transmitted by modulated carrier between the frequencies of 902 MHz and 928 MHz. Other frequency bands can be used as frequency allocation for an area permits. It will be appreciated that an incorrect binary sequence will leave the tag in a dormant state. See FIG. 5D. As illustrated in FIGS. 1 and 2, a clocked state machine 120, 220 within the tag 100, 200 advantageously can perform the modulation of the data carrier.

It must be mentioned that the number of unique identifier codes available corresponds to the number of bands into which the allocated frequency is divided. If the number of divisions is N, the number of unique binary identifiers is 1 less than the quantity 2 raised to the power N, i.e., $2^N-1$. For example, if the allocated frequency is divided into 4 sub-bands, the number of unique identifiers is 15. If the frequency is divided into 8 sub-bands, the number of unique identifiers is 255. If there are 15 sub-bands, the number of unique identifiers climbs to 32,767. As an operating example, the frequency of 2350 MHz to 2450 MHz is divided into 8 discreet frequency bands starting at 2355 MHz and ending at 2425 MHz, i.e., frequencies $f_1$-$f_8$. The lowest frequency, in an exemplary case, corresponds to the least significant bit (LSB) of the binary logic code. It should be mentioned that the number N of frequencies produced by frequency generator 330 is generally constrained by the selectively of the bandpass (notch) filters in the filter banks 108, 208 of RFID tags 100, 200, respectively.

Assume that there are two RFID tags, each with a unique logic code. Tag 100i has a logic code of 00101001 while tag $100_2$ has a logic code of 10001101. If the RFID interrogator 300 transmits a signal composed of $f_1$, $f_2$, $f_3$, and $f_4$, neither tag will respond to the query. If the transmitted signal is composed of frequencies $f_1$, $f_3$, $f_4$, and $f_8$, tag $100_2$ will respond with its data while tag $100_1$ will remain dormant. If the transmitted signal is composed of $f_1$, $f_4$, and $f_6$, tag $100_1$ will respond while tag $100_2$ will remain dormant.

In short, one of the advantage of RFID tagging and tracking system according to the present invention is that it provides a far field system that implements an anti-collision system in which the tag itself does not rely on a microprocessor to interpret an incoming trigger signal. Thus, the tag circuitry can be kept both very simple and inexpensive. Stated another way, the simplicity of the circuit allows for a small, inexpensive tag that can be employed to respond at greater distances than other simple RFID tags while enjoying the anti-collision ability of the more complex and expensive microprocessor based tags.

Moreover, the logic circuit 110 and the state machine 120 for the tag 100 advantageously can be designed from widely available discreet components. Preferably, both the logic (gate) circuit and the state machine can be formed using a single programmable logic device, as indicated by the dashed lines in FIGS. 1 and 2. The logic circuits 112 can be programmed onto a single Complex Programmable Logic Device (CPLD) or Field Programmable Gate Array (FPGA), such as those supplied by Xilinx. It will be noted that when the RFID tag design employs a CPLD or FPGA, the tag can be easily reprogrammed and reconfigured by the user thousands of times.

Timing of the circuitry can be accomplished through either a simple timer circuit (timer 116 in FIG. 1), such as a 555 timer circuit, or the use of a pulsed narrow-band frequency (such as 2440 MHz) from the RFID interrogator 300, applied to a narrow-band filter bank 208, rectifier bank 210, and ON/OFF logic circuit 217 (FIG. 2). The latter configuration would allow the RFID interrogator 300 to determine the rate at which data is sent from the tag 200. It will be noted that this would afford additional signal discrimination for the RFID tagging and tracking system.

It should be mentioned that the RFID tagging and tracking system, when equipped with a directional receive antenna, e.g., a directional antenna 302, advantageously can be employed to locate the equipment or person supporting a particular tag 100 or 200. For example, as show in FIG. 4, the interrogator 300' may be equipped with multiple antennas $302_1$–$302_M$ (only two being actually shown) and respective multiple front ends $310_1$–$310_M$ (two shown), the latter being electrically coupled to the control section 320. When the system is equipped with three antennas, the RFID interrogator 300' can resolve the location of any individual tag in two dimensional (2D) space; when the system is equipped with four antennas, the RFID interrogator 300' can resolve the location of any individual tag in three dimensional (3D) space. It will be appreciated that multiple front ends would permit real time or near real time determination of a tag's location while multiple antennas selectively coupled to a single front end would permit determination of the tag's position by a multi-step localization process.

It will also be recognized that determination of a tag's location would also be possible by operating a single RFID interrogator 300 from multiple locations or from a mobile platform, e.g., from a truck or airplane, to obtain the three or four bearing lines required to resolve the tag's location in 2D or 3D space, respectively. In addition, since the RFID interrogator 300 illustrated in FIG. 3 includes master/slave functionality, multiple RFID interrogators, one designated as the master interrogator and the others designated as slave interrogators, could operate cooperatively in determining the tag's position.

It should also be noted that, in an RF saturated environment, an additional band-pass (notch) filter could be placed between antenna circuit 102 (202) and amplifier circuit 106 (206).

Although presently preferred embodiments of the present invention have been described in detail herein above, it should be clearly understood that many variations and/or modifications of the basic inventive concepts herein taught, which may appear to those skilled in the pertinent art, will still fall within the spirit and scope of the present invention, as defined in the appended claims.

What is claimed is:

1. A far field radio frequency identification (RFID) tag having an associated tag identification (ID) responsive to a group of a plurality of continuous wave (CW), unmodulated signals selected from frequencies comprising a predetermined frequency band, that correspond to the tag ID of the RFID tag.

2. The RFID tag of claim 1 wherein each frequency corresponds to a bit of the RFID tag ID.

3. A far field radio frequency identification (RFID tag responsive to a plurality of continuous wave (CW), unmodulated signals selected from frequencies including a predetermined frequency band, the RFID tag comprising:

an antenna generating received CW signals responsive to the CW unmodulated signals;

a filter bank generating noise-free CW signals responsive to the received CW signals;

a rectifier bank generating a binary word responsive to the noise-reduced CW signals;

a logic circuit generating a command signal when the received binary word corresponds to a tag identifier code programmed into the logic circuit; and a state machine coupled to the antenna and responsive to the command signal generating information identifying the RFID tag for transmission via the antenna.

4. The RFID tag as recited in claim 3, further comprising a timer generating a clock signal applied to the state machine.

5. The RFID tag as recited in claim 3, further comprising a counter generating a count signal applied to the state machine in response to a supplied one of the CW unmodulated frequency signals.

6. The RFID tag as recited in claim 3, wherein the logic circuit comprises a field programmable gate array (FPGA).

7. The RFID tag as recited in claim 6, wherein the FPGA includes the state machine.

8. The RFID tag as recited in claim 3, further comprising a first switch electrically connected between the logic circuit and the state machine for selectively applying power to the state machine responsive to the command signal.

9. A method of operating a far field radio frequency identification (RFID) tag responsive to a plurality of continuous wave (CW), unmodulated signals selected from frequencies comprising a predetermined frequency band, comprising:

receiving the plurality of CW unmodulated signals;

determining whether a binary word indicated by the received plurality of CW unmodulated signals taken together as a group of frequency matches;

a tag identifier for the RFID tag programmed into a logic circuit; and outputting information distinguishing the RFID tag from similar RFID tags when the binary word matches the tag identifier.

10. The method as recited in claim 9, wherein:

the binary word corresponds to M of N possible frequencies in the predetermined frequency band;

M and N are positive integers; and N≧M.

11. The method of claim 9 wherein each frequency corresponds to a bit of the tag identifier.

12. A far field radio frequency identification (RFID) tagging and tracking system employing a plurality of continuous wave (CW), unmodulated signals selected from frequencies comprising a predetermined frequency band, the system including a RFID interrogator generating a group of CW unmodulated signals, the group of frequencies as a whole corresponding to a RFID tag and receiving a tag identification (ID) signal sequence uniquely identifying the RFID tag.

13. The RFID tagging and tracking system of claim 12 wherein each frequency corresponds to a bit of the tag ID.

14. A far field radio frequency identification (RFID) tagging and tracking system employing a plurality of continuous wave (CW), unmodulated signals selected from frequencies comprising a predetermined frequency band, the system including an RFID interrogator generating a group of CW unmodulated signals corresponding to an RFID tag and receiving a tag identification (ID) signal sequence uniquely identifying the RFID tag, wherein:

the RFID interrogator comprises:
first and second antennas;
a front end coupled to the first antenna that extracts the tag ID signal sequence from a received signal;
a controller receiving the tag ID signal sequence and generating control signals;
a multiple frequency generator generating a plurality of CW unmodulated frequency signals;
a switch array responsive to the control signals that route selected ones of the CW unmodulated frequency signals to a frequency summer; and
the frequency summer, which applies the selected ones of the CW unmodulated frequency signals to the second antenna; and
the RFID tag comprises:
a third antenna generating received CW signals responsive to the selected ones of the CW unmodulated frequency signals output by the second antenna;
a filter bank generating noise-free CW signals responsive to the received CW signals;
a rectifier bank generating a binary word responsive to the noise-reduced CW signals;
a logic circuit generating a command signal when the received binary word corresponds to a tag identifier code programmed into the logic circuit; and
a state machine coupled to the third antenna and responsive to the command signal generating the tag ID signal sequence for transmission via the third antenna to the RFID interrogator.

15. The RFID tagging and tracking system as recited in claim 14, further comprising a timer generating a clock signal applied to the state machine.

16. The RFID tagging and tracking system as recited in claim 14, further comprising a counter generating a count signal applied to the state machine in response to a supplied one of the CW unmodulated frequency signals.

17. The RFID tagging and tracking system as recited in claim 14, wherein the logic circuit comprises a field programmable gate array (FPGA).

18. The RFID tagging and tracking system as recited in claim 17, wherein the FPGA includes the state machine.

19. The RFID tagging and tracking system as recited in claim 14, further comprising a first switch electrically connected between the logic circuit and the state machine for selectively applying power to the state machine responsive to the command signal.

20. The RFID tagging and tracking system as recited in claim 14, wherein the CW unmodulated frequency signals and the tag ID signal sequence occupy first and second frequency bands.

21. The RFID tagging and tracking system as recited in claim 14, wherein: the first antenna comprises a directional antenna; and the controller determines a bearing line to the RFID tag.

22. The RFID tagging and tracking system as recited in claim 14, wherein the controller provides a data storage function and a display function.

23. A method for operating a far field radio frequency identification (RFID) tagging and tracking system responsive to a plurality of continuous wave (CW), unmodulated frequency signals selected from frequencies comprising a predetermined frequency band, wherein a RFID interrogator includes a multiple frequency generator producing the frequencies included in the predetermined frequency band, a controller, a switch array operated by the controller, and a frequency summer for combining the CW unmodulated frequency signals output by the switch array, while a RFID tag includes an antenna, a filter bank, a rectifier bank, a logic circuit, and a state machine, electrically coupled to one another in the recited order, the state machine being coupled to a RFID tag antenna, a power source supplying power to the RFID tag, comprising:
transmitting CW unmodulated frequency signals corresponding to a binary word;
extracting the binary word from the CW unmodulated frequency signals;
comparing the binary word to a tag identifier for the RFID tag programmed into the logic circuit; and
when the binary word matches the tag identifier, controlling the state machine to output a tag identification (ID) signal sequence distinguishing the RFID tag from similar RFID tags.

24. The method as recited in claim 23, wherein:
the binary word corresponds to M of N possible frequencies in the predetermined frequency band;
M and N are positive integers; and N≧M.

25. A far field radio frequency identification (RFID) tag having a binary identification, the tag comprising:
an antenna to receive a plurality of different, unmodulated, continuous wave (CW) electromagnetic frequencies from an interrogator;
a first circuit to provide an indication that the plurality of received CW frequencies together as a group of frequencies correspond to the binary identification; and
a second circuit to send a message to the interrogator in response to the indication.

26. The RFID tag of claim 25 wherein the frequencies are selected to from a predetermined frequency band and the binary identification corresponds to M of N possible frequencies in the predetermined frequency band where M and N are positive integers and N≧M.

27. The RFID tag of claim 26 wherein the frequencies are selected by dividing the frequency band into a number of discreet frequency sub-bands.

28. The RFID tag of claim 25 wherein each frequency corresponds to a bit of the binary identification ID.

29. A far field radio frequency identification (RFID) system comprising:
an interrogator to transmit a plurality of different, unmodulated, continuous wave (CW) electromagnetic frequencies wherein the plurality of unmodulated CW frequencies as a group of signals correspond to a binary identification; and
an RFID tag corresponding to the binary identification to receive the plurality of different unmodulated, continuous wave (CW) electromagnetic frequencies and to transmit a message to the interrogator in response to the received frequencies.

30. The RFID system of claim 29 wherein the frequencies are selected to from a predetermined frequency band and the binary identification corresponds to M of N possible frequencies in the predetermined frequency band where M and N are positive integers and N≧M.

31. The RFID system of claim 30 wherein the frequencies are selected by dividing the frequency band into a number of discreet frequency sub-bands.

32. The RFID system of claim 29 wherein each frequency corresponds to a bit of the binary identification ID.

* * * * *